(12) United States Patent
Durand et al.

(10) Patent No.: US 12,384,512 B2
(45) Date of Patent: Aug. 12, 2025

(54) DEVICE FOR ABSORBING ENERGY BY COMPRESSION, AIRCRAFT COMPRISING AT LEAST ONE SUCH DEVICE

(71) Applicant: Airbus Operations (S.A.S.), Toulouse (FR)

(72) Inventors: Jérôme Durand, Toulouse (FR); Marc Vandersteen, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 18/976,639

(22) Filed: Dec. 11, 2024

(65) Prior Publication Data

US 2025/0196988 A1     Jun. 19, 2025

(30) Foreign Application Priority Data

Dec. 14, 2023   (FR) .................................. FR2314131

(51) Int. Cl.
*B32B 3/12*     (2006.01)
*B64C 1/00*     (2006.01)

(52) U.S. Cl.
CPC .................. *B64C 1/00* (2013.01); *B32B 3/12* (2013.01); *B64C 2001/0054* (2013.01)

(58) Field of Classification Search
CPC ..... B64C 1/00; B64C 2001/0054; B64C 1/06; B64C 1/062; B32B 3/12; B32B 2307/558; F16F 7/12
See application file for complete search history.

(56) References Cited

U.S. PATENT DOCUMENTS

| | | | |
|---|---|---|---|
| 9,637,212 B2 | 5/2017 | Cottet | |
| 2009/0184200 A1 | 7/2009 | Lin | |
| 2018/0100621 A1* | 4/2018 | Tyan | ....................... B32B 25/02 |

FOREIGN PATENT DOCUMENTS

| | | |
|---|---|---|
| EP | 1426289 A1 | 6/2004 |
| EP | 1930237 A1 | 6/2008 |
| EP | 2505490 A1 | 10/2012 |
| EP | 3129220 B1 | 9/2020 |
| GB | 2555862 A | 5/2018 |

* cited by examiner

*Primary Examiner* — Valentina Xavier
(74) *Attorney, Agent, or Firm* — KDW Firm PLLC

(57) ABSTRACT

A device for absorbing energy by compression including several first conduits spaced apart from one another and oriented in a compression direction and joining walls which are parallel to the compression direction and connect the first conduits so as to delimit, with the latter, at least one second conduit. This solution makes it possible to absorb a greater quantity of energy. An aircraft including at least one such device for absorbing energy is also disclosed.

15 Claims, 19 Drawing Sheets

DEVICE FOR ABSORBING ENERGY BY COMPRESSION, AIRCRAFT COMPRISING AT LEAST ONE SUCH DEVICE

TECHNICAL FIELD

The subject matter herein relates to a device for absorbing energy by compression and to an aircraft comprising at least one such device.

BACKGROUND

According to an embodiment, a panel comprises first and second skins and a cellular structure, interposed between the first and second skins, which comprises a plurality of conduits oriented perpendicularly to the first and second skins. This cellular structure has a honeycomb geometry and comprises a plurality of identical, juxtaposed conduits of hexagonal section. Generally, the conduits are of small section, which gives the panel high compression strength (loads perpendicular to the skins). Such panels are not used as modules for absorbing energy by compression.

According to an embodiment described in document U.S. Pat. No. 9,637,212, an aircraft comprises a module for absorbing energy by compression positioned between the skin of the fuselage and a fairing. This module comprises a cellular structure comprising a plurality of conduits oriented parallel to the skin of the fuselage and to the fairing. This cellular structure has a honeycomb geometry and comprises a plurality of identical, juxtaposed conduits of hexagonal section oriented in a direction perpendicular to a deformation direction. This embodiment does not make it possible to absorb a great quantity of energy. Patent GB 2555862 discloses an aircraft protective component comprising conduits and the direction of the axes of these conduits is orthogonal to the compression direction. Patent EP 2505490 discloses a type of shock absorber comprising a multitude of conduits that are contiguous with one another. In addition, the absorber does not comprise end walls closing the first and second end of a conduit. Patent EP 1426289 relates to a fuselage structure including an energy absorber having a capacity for absorbing energy by compression, the absorber not being able to be separated from the fuselage, and not comprising end walls closing the first and second end of a conduit. Patent EP 1930237 discloses a helicopter primary structure adapted to be subjected to deformations, and therefore does not comprise a device for absorbing energy by compression within the meaning of the disclosure herein.

SUMMARY

The disclosure herein aims to remedy all or some of the drawbacks of the prior art.

To this end, a subject of the disclosure herein is a device for absorbing energy by compression configured to be positioned between first and second elements and to be subjected to compressive loads oriented in a compression direction, the device comprising at least one module for absorbing energy by compression which comprises several first conduits which are oriented in the compression direction and each have a cross section and first and second ends.

According to the disclosure herein, first conduits are spaced apart from one another. In addition, the module for absorbing energy by compression comprises joining walls, parallel to the compression direction, which connect these first conduits so as to delimit, with the latter, at least one second conduit. In addition, each module for absorbing energy by compression comprises at least one first end wall configured to close the first end of at least one first conduit and at least one second end wall configured to close the second end of at least one first conduit.

Such a module for absorbing energy by compression makes it possible to absorb a great quantity of energy.

According to another feature, the first end wall is configured so as to leave the second conduit at least partially open. According to another feature, the second end wall is configured so as to leave the second conduit at least partially open. According to another feature, the first end wall and the second end wall are each configured so as to leave the second conduit at least partially open.

According to another feature, each of the first conduits delimiting the second conduit is spaced apart from all the other first conduits delimiting this same second conduit, in order to optimize the compression capacity of the module.

According to another feature, each second conduit has a cross section greater than the cross section of each first conduit bordering the second conduit.

According to another feature, the joining walls are oriented in two or three directions so as to obtain a network of the orthogrid or isogrid type.

According to another feature, the module for absorbing energy by compression comprises at least one second conduit of square or rectangular cross section, the first conduits being positioned on the sides of the cross section of the substantially square or rectangular second conduit and spaced apart from the vertices of the cross section of each second conduit.

According to another feature, the module for absorbing energy by compression comprises, on at least one side of the second conduit, two or three cylindrical and/or semicylindrical first conduits.

According to another feature, the module for absorbing energy by compression comprises, on the sides of the second conduit, two or three cylindrical and/or semicylindrical first conduits.

According to another feature, the module for absorbing energy by compression comprises at least one side of the second conduit that is free from first conduits.

According to another feature, the module for absorbing energy by compression comprises one or more first end walls closing the first end of all the first conduits and leaving the second conduit at least partially open, and one or more second end walls closing the second end of all the first conduits and leaving the second conduit at least partially open.

According to another feature, each of the first and second end walls forms a frame delimited by an inner edge and by an outer edge spaced apart from the inner edge by a distance sufficient to close all the first conduits of the module for absorbing energy by compression.

According to another feature, each module for absorbing energy by compression comprises at least one attachment system for connecting it to at least one element from among the first and second elements between which the module for absorbing energy by compression is positioned.

According to another feature of the disclosure herein, the device for absorbing energy by compression comprises at least two modules for absorbing energy by compression, including at least one module for absorbing energy by compression which comprises at least one joining wall in common with another module for absorbing energy by compression.

According to another feature of the disclosure herein, at least one of the joining walls of the device for absorbing energy by compression comprises at least one system for fastening to at least one first end wall and to at least one second end wall.

More particularly, the common joining wall comprises at least one fastening system.

Even more particularly, at least one of the joining walls parallel to the common wall comprises fasteners.

According to another feature of the disclosure herein, one of the joining walls of the module for absorbing energy by compression comprises at least one system for fastening to at least one first end wall and to at least one second end wall.

A further subject of the disclosure herein is an aircraft comprising at least one device for absorbing energy by compression according to one of the preceding features.

BRIEF DESCRIPTION OF THE DRAWINGS

Other features and advantages will become apparent from the following description of the disclosure herein, the description being given solely by way of example, with reference to the attached drawings, in which.

DETAILED DESCRIPTION

Figure 1:
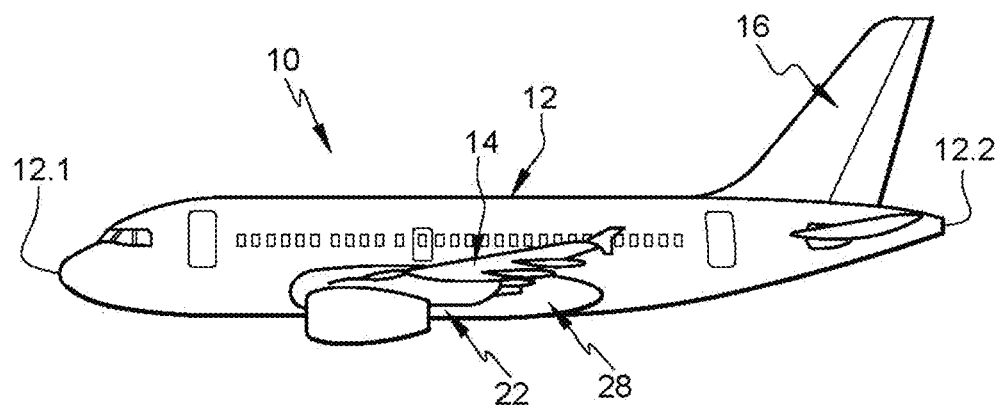
FIG. 1 is a side view of an aircraft.
Figure 2:
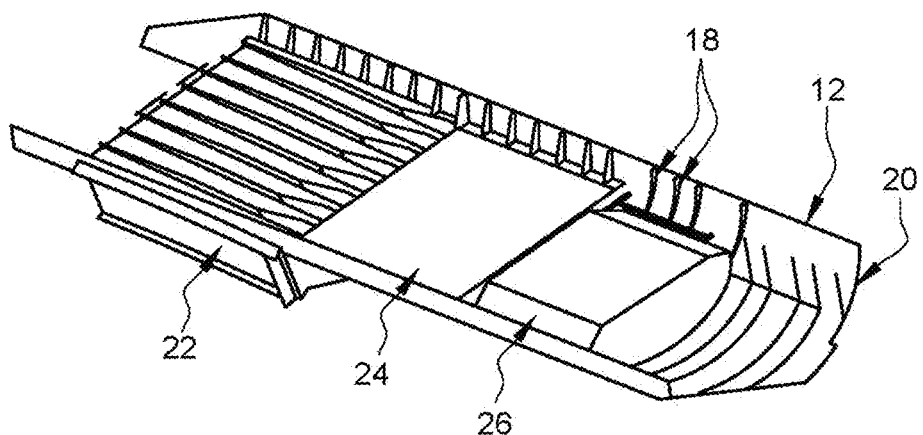
FIG. 2 is a perspective view of a lower part of an aircraft, illustrating an embodiment of the disclosure herein.
Figure 3:
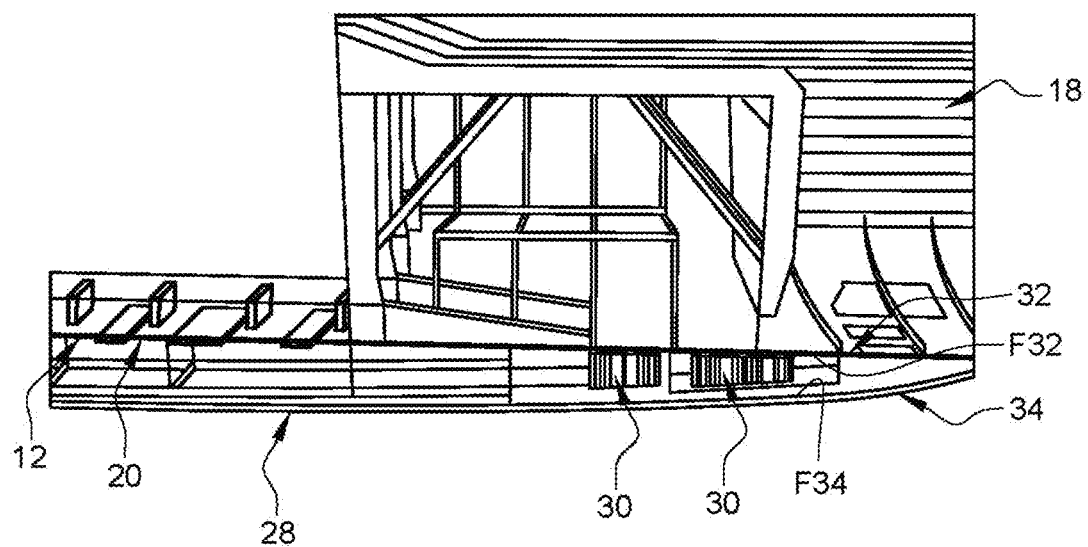
FIG. 3 is a longitudinal cross section of a lower part of an aircraft fuselage comprising modules for absorbing energy by compression in the non-deformed state, illustrating an embodiment of the disclosure herein.

According to an embodiment visible in FIG. 1, an aircraft 10 comprises a fuselage 12 which extends from a nose cone 12.1 to a tail cone 12.2, wings 14 positioned on either side of the fuselage 12, and a tail unit 16 positioned at the tail cone 12.2 of the fuselage 12.

For the remainder of the description, a longitudinal direction is a direction parallel to a longitudinal axis, which is substantially horizontal when the aircraft is on the ground, and which extends from the nose cone 12.1 to the tail cone 12.2. The aircraft 10 has a vertical longitudinal plane of symmetry containing the longitudinal axis.

The fuselage 12 also comprises a primary structure 18 composed of frames and stringers, and a skin 20 attached to the primary structure 18. It also comprises a central wing box 22 and a landing gear bay 24 offset rearwards with respect to the central wing box 22. According to one configuration, the fuselage 12 comprises at least one tank 26 offset rearwards with respect to the landing gear bay 24.

The aircraft 10 comprises a belly fairing 28 which extends below the central wing box 22, the landing gear bay 24 and the tank 26 and has a width substantially equal to the width of the fuselage 12. At least in line with the tank 26, the belly fairing 28 and the fuselage 12 (more particularly the skin 20 of the fuselage 12) are spaced apart. According to one configuration, the tank 26 is a structural tank partially integrated into the structure of the fuselage 12.

The aircraft 10 comprises at least one device for absorbing energy by compression, interposed between the belly fairing 28 and the fuselage 12 (more particularly the skin 20 of the fuselage 12), which comprises at least one module 30 for absorbing energy by compression interposed between the belly fairing 28 and the fuselage 12 (more particularly the skin 20 of the fuselage 12). According to one configuration, the aircraft 10 comprises at least one module 30 for absorbing energy by compression interposed between the belly fairing 28 and the tank 26, positioned below the latter. This configuration makes it possible to add an additional tank 26 to the rear of the landing gear bay 24, the tank 26 being protected by at least one module 30 for absorbing energy by compression in the event of a vertical impact on the belly fairing 28.

Figure 4:
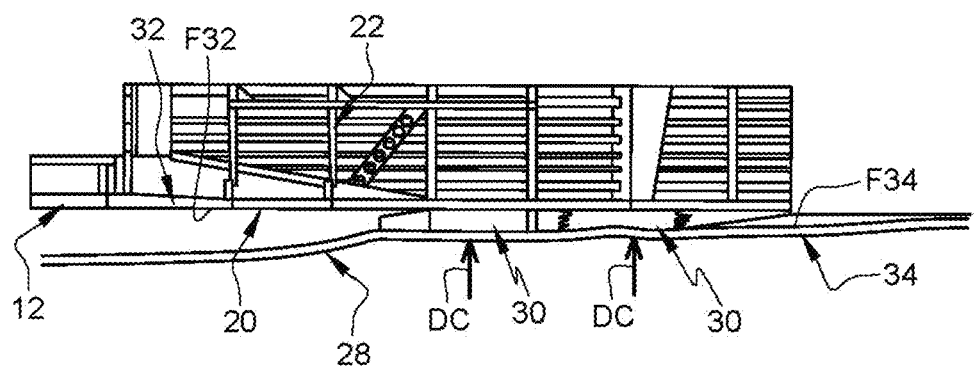
FIG. 4 is a longitudinal cross section of a lower part of an aircraft fuselage comprising modules for absorbing energy by compression in the deformed state, illustrating an embodiment of the disclosure herein.

Of course, the disclosure herein is not limited to this arrangement. Thus, the device for absorbing energy by compression could be positioned at another location on the aircraft. More generally, the device for absorbing energy by compression is configured to be positioned between first and second elements 32, 34, more specifically between first and second contact surfaces F32, F34, and to be subjected to compressive loads oriented in a compression direction DC (visible in FIG. 4) secant with the first and second elements 32, 34. According to a first arrangement, the first and second contact surfaces F32, F34 are substantially parallel to one another and substantially perpendicular to the compression direction DC. According to another arrangement, the first and second contact surfaces F32, F34 are not parallel to one another, and one of them is perpendicular to the compression direction DC.

Each module 30 for absorbing energy by compression comprises several first conduits 36 which are spaced apart from one another, are oriented in the compression direction DC and each have a first cross section (perpendicular to the compression direction DC) and joining walls 38 parallel to the compression direction DC and connecting first conduits 36 so as to delimit, with the latter, at least one second conduit 40 which has a second cross section (perpendicular to the compression direction DC).

According to an embodiment, each of the first conduits 36 delimiting the conduit 40 is spaced apart from all other conduits 36 delimiting this same conduit 40. According to a particular embodiment, the module 30 for absorbing energy by compression may comprise at least one conduit 36 not delimiting the conduit 40. More particularly, the first conduits 36 not delimiting the conduit 40 may share part of their side wall 42 with the first conduits 36 delimiting the conduit 40. For example, the first conduits 36 delimiting the conduit 40 and the conduits 36 not delimiting the conduit 40 may be configured to be semicylindrical such that, if these two conduits 36 share part of their side wall 42, a cylindrical shape is obtained, the latter comprising part of the common side wall 42.

Each first conduit 36 has a side wall 42 and extends between first and second ends 42.1, 42.2 oriented towards the first and second elements 32, 34, respectively.

Figure 11:
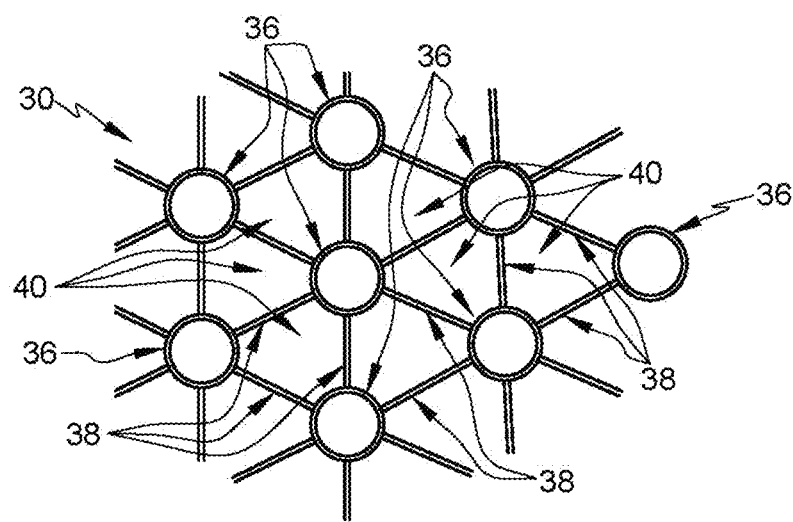
FIG. 11 is a top view of a module for absorbing energy by compression, illustrating an embodiment of the disclosure herein.

According to an embodiment visible in FIG. 11, the first conduits 36 of a given module 30 for absorbing energy by compression all have the same cross section.

Figure 9:
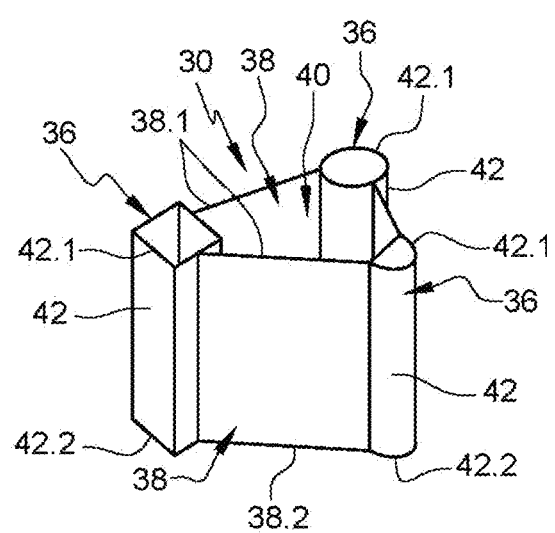
FIG. 9 is a perspective view of a module for absorbing energy by compression, illustrating an embodiment of the disclosure herein.

According to an embodiment visible in FIG. 9, the first conduits 36 of a given module 30 for absorbing energy by compression have different cross sections.

According to the various embodiments, the first cross sections of the first conduits 36 may be prismatic, square, rectangular, triangular, circular or semicircular. Of course, the disclosure herein is not limited to these geometries for the first cross sections of the first conduits 36.

According to an embodiment visible in FIGS. 5 to 8 and 15 to 19, a module 30 for absorbing energy by compression comprises first conduits 36 having circular or semicircular first cross sections of substantially the same diameter.

The first conduits 36 have for example a first cross section of between 20 cm$^2$ and 200 cm$^2$.

Figure 10:
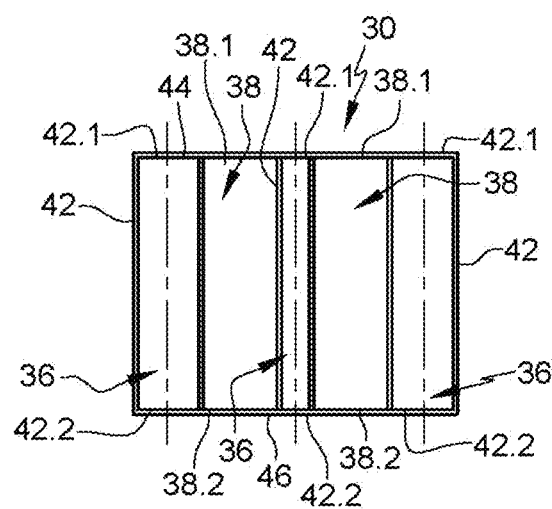
FIG. 10 is a side view of a module for absorbing energy by compression, illustrating an embodiment of the disclosure herein.

According to embodiments visible in particular in FIGS. 9 and 10, each joining wall 38 is substantially rectangular and extends between first and second edges 38.1, 38.2 oriented towards the first and second elements 32, 34, respectively, and third and fourth edges 38.1, 38.2 connected to first conduits 36.

Depending on the configurations, the joining walls 38 are planar. Some joining walls 38 may be non-planar and may have at least one hollow form to at least partially accommodate a first conduit 36 of another module 30 for absorbing energy by compression.

Figure 5:
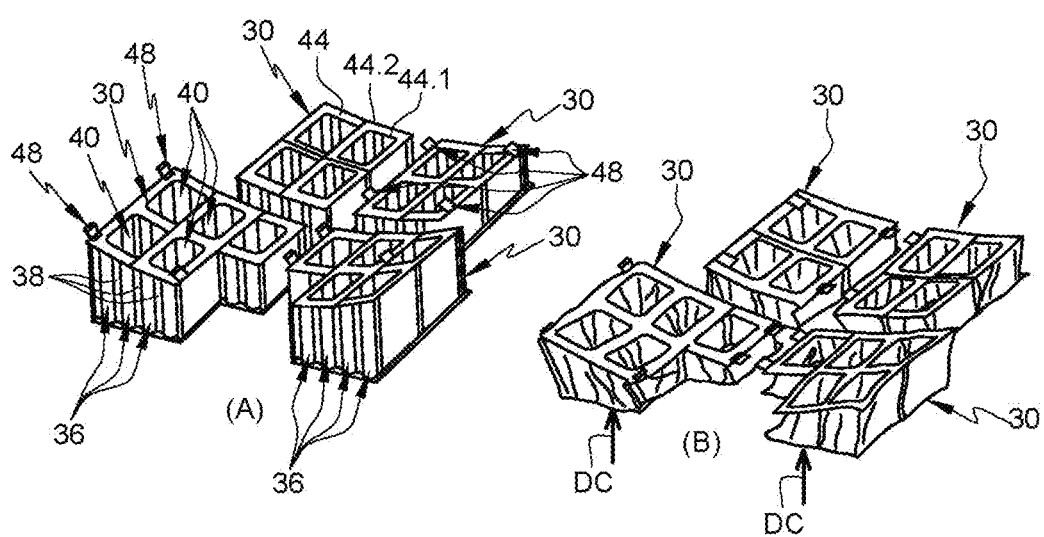
FIG. 5 is a perspective view of modules for absorbing energy by compression, illustrating an embodiment of the disclosure herein, in the non-deformed state in part (A) and in the deformed state in part (B)
Figure 6:
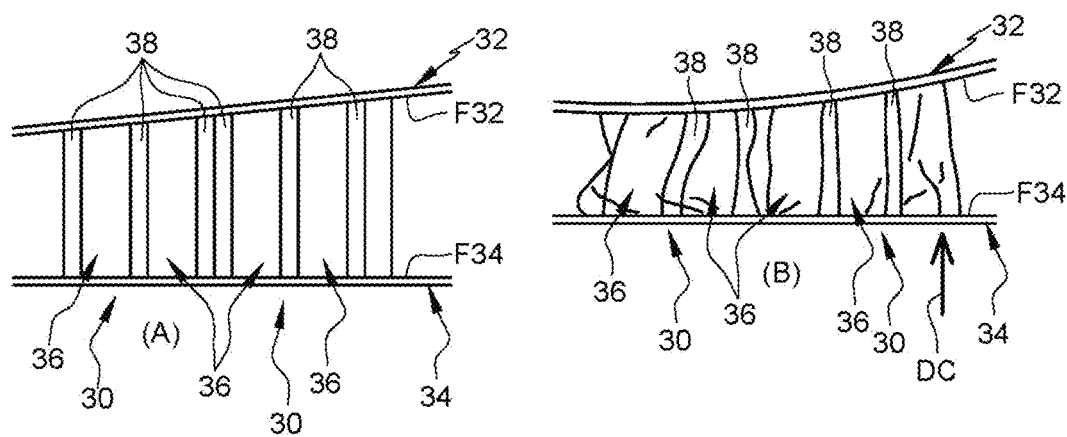
FIG. 6 is a side view of two modules for absorbing energy by compression, illustrating an embodiment of the disclosure herein, in the non-deformed state in part (A) and in the deformed state in part (B)
Figure 7:
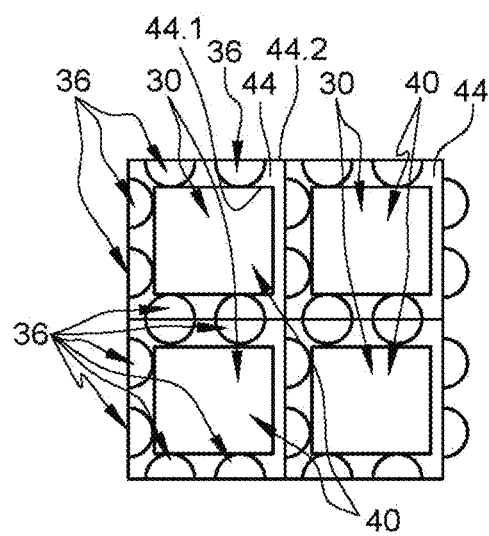
FIG. 7 is a top view of modules for absorbing energy by compression, illustrating an embodiment of the disclosure herein.
Figure 8:
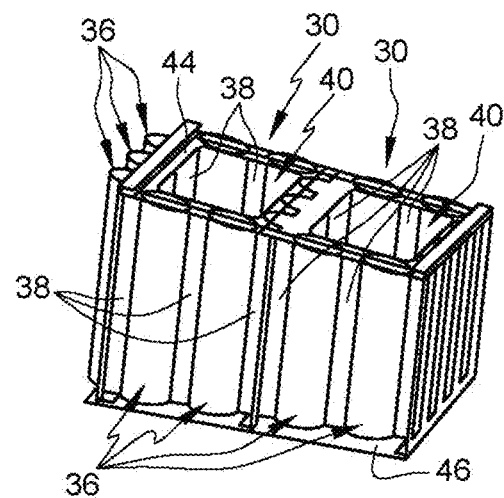
FIG. 8 is a perspective view of modules for absorbing energy by compression, illustrating an embodiment of the disclosure herein.

According to an embodiment, the joining walls 38 of the modules 30 for absorbing energy by compression are oriented in two or three directions so as to obtain a joining-wall network of the orthogrid type, as illustrated in FIGS. 5, 7, 8, 12 and 15 to 19, or of the isogrid type, as illustrated in FIG. 6. This solution enables compression of the first conduits 36, which ensures an absorption of energy and not buckling of the first conduits 36.

According to one arrangement, the joining walls 38 form a network of the orthogrid type and are oriented in a first direction parallel to the longitudinal direction and in a second direction perpendicular to the longitudinal direction.

Figure 19:
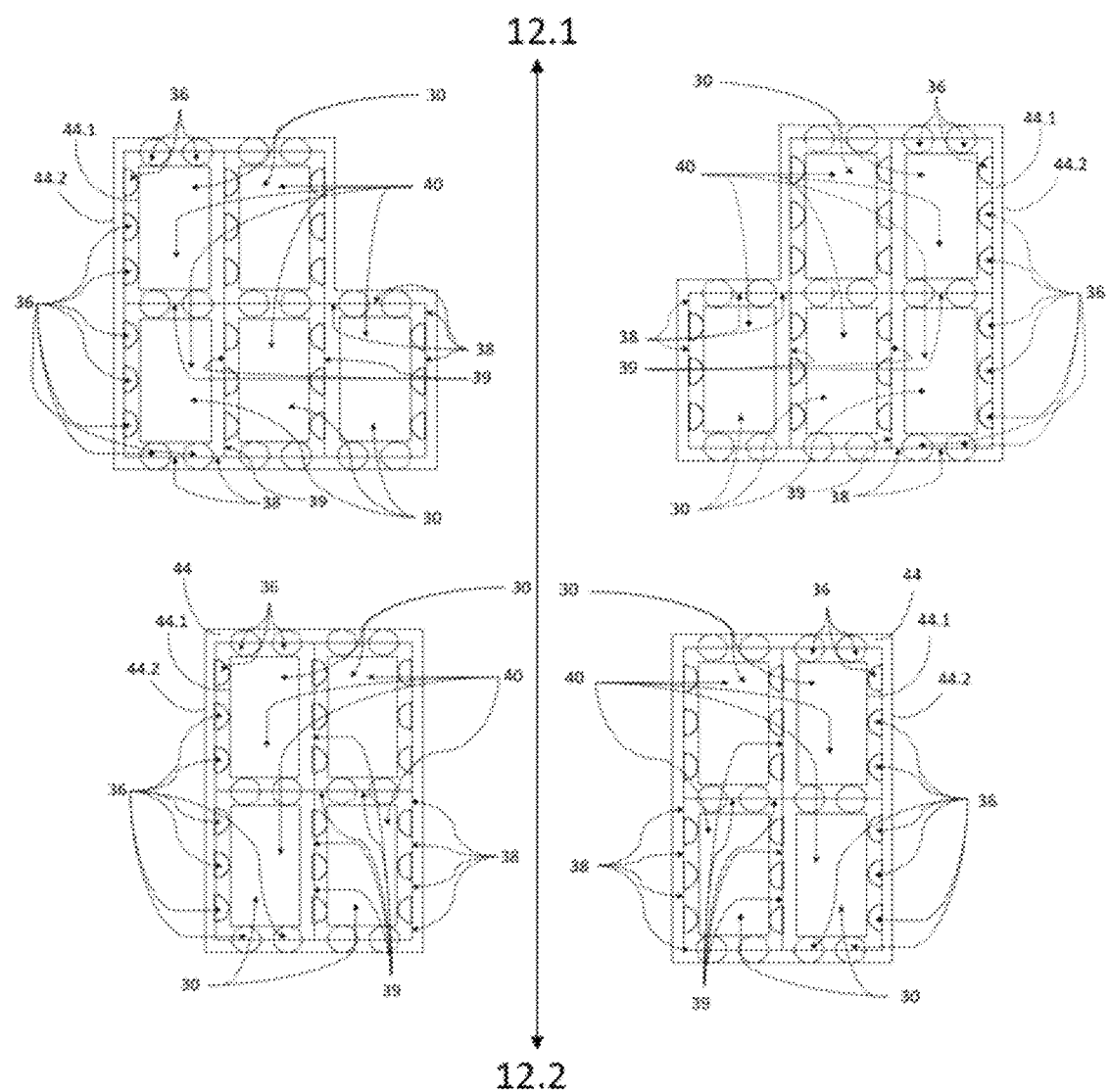
FIG. 19 is a top view of several devices for absorbing energy by compression configured to be positioned between first and second elements (32, 34) of an aircraft.

According to one configuration shown in FIG. 19, the device for absorbing energy by compression comprises several modules 30 for absorbing energy by compression positioned symmetrically with respect to the vertical longitudinal plane of symmetry of the aircraft.

The first ends 42.1 of the first conduits 36 and the first edges 38.1 of the joining walls 38 of a given module 30 for absorbing energy by compression are positioned in one and the same first plane or the same near-planar first surface.

In addition, the second ends 42.2 of the first conduits 36 and the second edges 38.2 of the joining walls 38 of a given module 30 for absorbing energy by compression are positioned in one and the same second plane or the same near-planar second surface.

The joining walls 38 are connected to the first conduits 36 by any appropriate means, such as welding, for example. In a variant, the joining walls 38 and the first conduits 36 of a module 30 for absorbing energy by compression are made in one piece by an additive manufacturing process, for example.

According to an embodiment, the joining walls 38 and the first conduits 36 of a module 30 for absorbing energy by compression are made of aluminum alloy, in particular from sheets of aluminum alloy.

For each second conduit 40, the second cross section thereof corresponds to a zone delimited by the joining walls 38 and a part of the side walls 42 of the first conduits 36 and does not comprise the first cross sections of the first conduits 36 bordering it.

According to an embodiment of the disclosure herein, for each module 30 for absorbing energy by compression, the second cross section of the second conduit 40 is greater than that (those) of the first conduits 36. According to one configuration, the second cross section of the second conduit 40 is at least two times greater than the first cross section of each first conduit 36 bordering the second conduit 40. Such a module for absorbing energy by compression makes it possible to absorb a greater quantity of energy.

According to one configuration, the second cross section of the second conduit 40 is greater than the sum of the first cross sections of the first conduits 36 bordering the second conduit 40 and less than 10 times the sum of the first cross sections of the first conduits 36 bordering the second conduit 40.

According to one configuration, the joining walls 38 and the first conduits 36 of a given module 30 for absorbing energy by compression are arranged such that the second conduit 40 has a prismatic, square, rectangular, triangular or circular cross section. Of course, the disclosure herein is not limited to these geometries for the cross sections of the second conduit 40.

According to an embodiment, the module 30 for absorbing energy by compression comprises at least one second conduit 40. According to another embodiment, the module 30 for absorbing energy by compression comprises several second conduits 40. According to one arrangement, the second conduits 40 of a given module 30 for absorbing energy by compression are all identical, as illustrated in FIG. 11.

According to arrangements visible in FIGS. 9 and 11, the module 30 for absorbing energy by compression comprises at least one second conduit 40 having a triangular second cross section, the first conduits 36 being positioned at the vertices of the cross section of each second conduit 40.

According to another arrangement visible in FIGS. 5 to 8 and 15 to 19, the module 30 for absorbing energy by compression comprises at least one second conduit 40 having a second cross section bordered by first conduits 36 that are spaced apart from the vertices of the cross section of each second conduit 40. In a particular embodiment, the module 30 for absorbing energy by compression comprises at least one second conduit 40 having a square or rectangular second cross section.

According to the arrangement visible in FIGS. 5 to 8 and 15 to 19, the module 30 for absorbing energy by compression comprises at least one second conduit 40 which has a second cross section bordered by cylindrical and/or semi-cylindrical first conduits 36. In an embodiment, the first conduits 36 are positioned on the sides of the second cross section and spaced apart from the vertices of this second cross section. More particularly, the module 30 for absorbing energy by compression comprises, on the sides of the second conduit 40, two or three cylindrical and/or semicylindrical first conduits 36. In a more particular embodiment, the module 30 for absorbing energy by compression comprises at least one second conduit 40 having a square or rectangular second cross section.

According to the arrangement visible in FIGS. 5 to 8 and 15 to 19, the module 30 for absorbing energy by compression comprises, on the sides of the second conduit 40, two or three cylindrical and/or semicylindrical first conduits 36.

The second conduit 40 has a second cross section of between 200 and 2000 cm$^2$.

The dimensions and the material(s) of the first conduits 36 and of the joining walls 38 are determined so as to obtain gradual compression of the first conduits 36, promoting the absorption of energy and not buckling of the conduits.

For all the embodiments, the module 30 for absorbing energy by compression comprises at least one first end wall 44 configured to close the first end 42.1 of at least one first conduit 36 and at least one second end wall 46 configured to close the second end 42.2 of at least one first conduit 36.

According to another feature, the first end wall 44 is configured so as to leave the second conduit 40 at least partially open. According to another feature, the second end wall 46 is configured so as to leave the second conduit 40 at least partially open.

According to an embodiment, the module 30 for absorbing energy by compression comprises at least one first end wall 44 configured to close the first end 42.1 of at least one first conduit 36 and leaving the second conduit 40 at least partially open, and at least one second end wall 46 configured to close the second end 42.2 of at least one first conduit 36 and leaving the second conduit 40 at least partially open.

According to one arrangement, the module 30 for absorbing energy by compression comprises one or more first end walls 44 closing the first end 42.1 of all the first conduits 36 and leaving the second conduit 40 at least partially open, and one or more second end walls 46 closing the second end 42.2 of all the first conduits 36 and leaving the second conduit 40 at least partially open.

According to one configuration, a first end wall 44 is configured to close the first ends 42.1 of several first conduits 36 of the module 30 for absorbing energy by compression. A second end wall 46 is configured to close the second ends 42.2 of several conduits 36 of the module 30 for absorbing energy by compression.

According to one arrangement, the first end wall 44 is configured to close the first ends 42.1 of all the first conduits 36 of the module 30 for absorbing energy by compression. This first end wall 44 forms a frame delimited by an inner edge 44.1 and an outer edge 44.2 spaced apart from the inner edge 44.1 by a distance sufficient to close the first conduits 36 of the module 30 for absorbing energy by compression. The second end wall 46 is configured to close the second ends 42.2 of all the first conduits 36 of the module 30 for absorbing energy by compression. This second end wall 46 forms a frame delimited by an inner edge and an outer edge spaced apart from the inner edge by a distance sufficient to close the first conduits 36 of the module 30 for absorbing energy by compression.

Of course, the disclosure herein is not limited to this number and to this geometry for the first and second end walls 44, 46. Thus, each of the first and second end walls 44, 46 may be formed of a single wall or of several juxtaposed walls.

According to an embodiment, the first and second end walls 44, 46 form part of the module 30 for absorbing energy by compression and are connected to the first conduits 36 and to the joining walls 38 by any appropriate means, such as welding, for example. Of course, the disclosure herein is not limited to this embodiment. Thus, at least one of the first and second end walls 44, 46 could not form part of the module 30 for absorbing energy by compression and be integral with the first or second element 32, 34 between which the module 30 for absorbing energy by compression is positioned.

Figure 12:
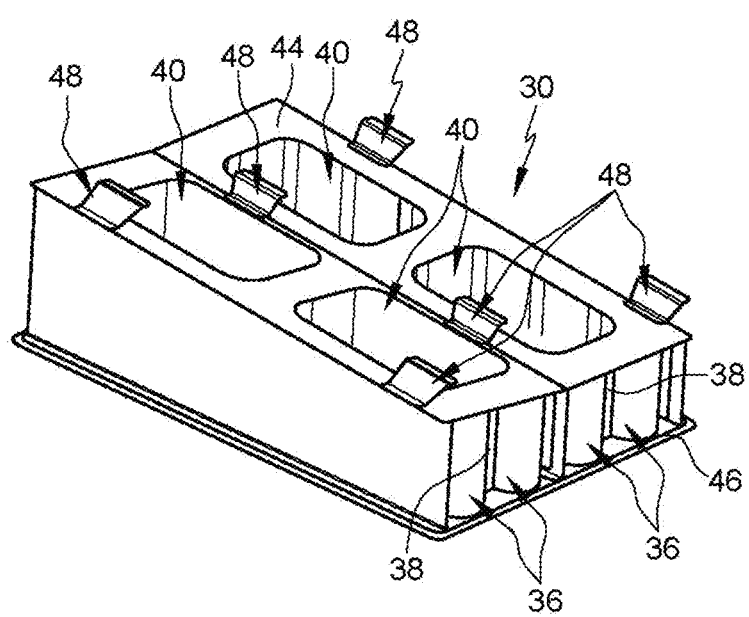
FIG. 12 is a perspective view of a module for absorbing energy by compression, illustrating an embodiment of the disclosure herein.
Figure 13:
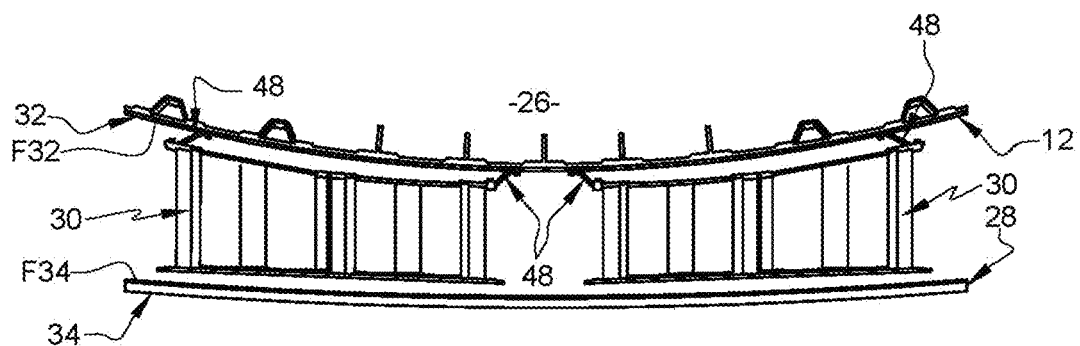
FIG. 13 is a cross section of a part of an aircraft comprising several modules for absorbing energy by compression suspended below a tank, illustrating an embodiment of the disclosure herein.
Figure 14:
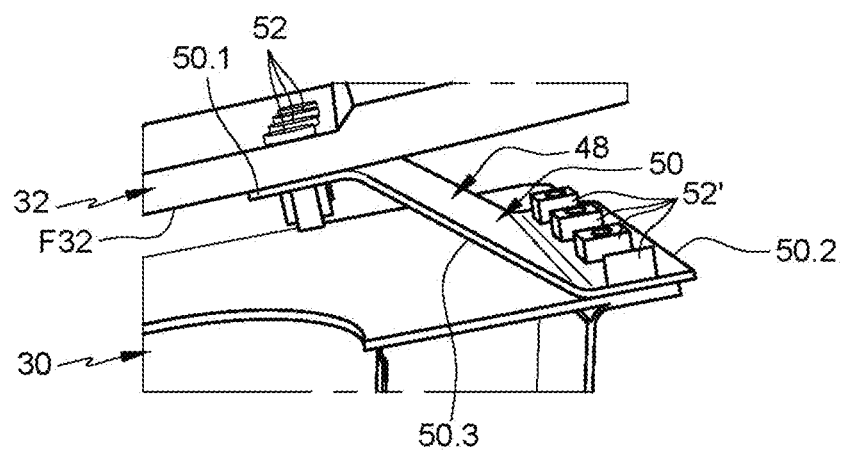
FIG. 14 is a perspective view of a connection connecting a module for absorbing energy by compression and an element of the aircraft, illustrating an embodiment of the disclosure herein.
Figure 15:
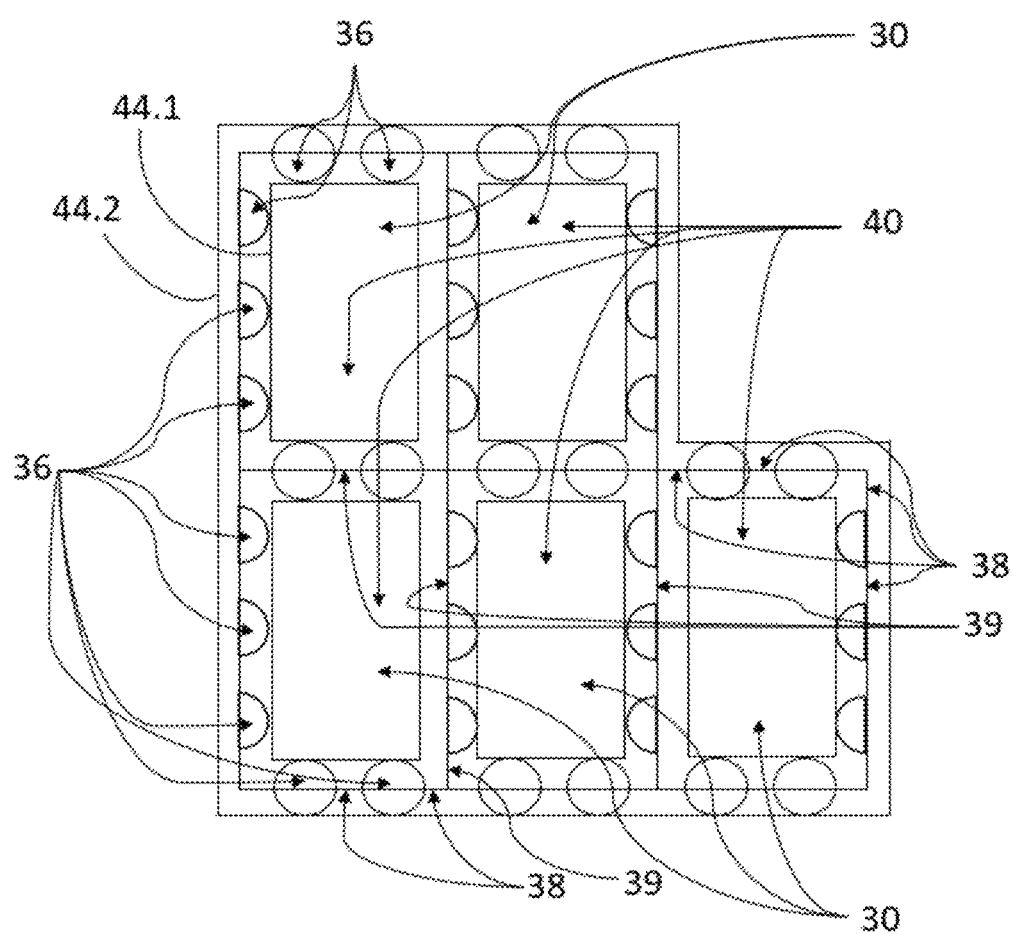
FIG. 15 is a top view of a device for absorbing energy by compression comprising five modules for absorbing energy by compression, illustrating an embodiment of the disclosure herein.
Figure 16:
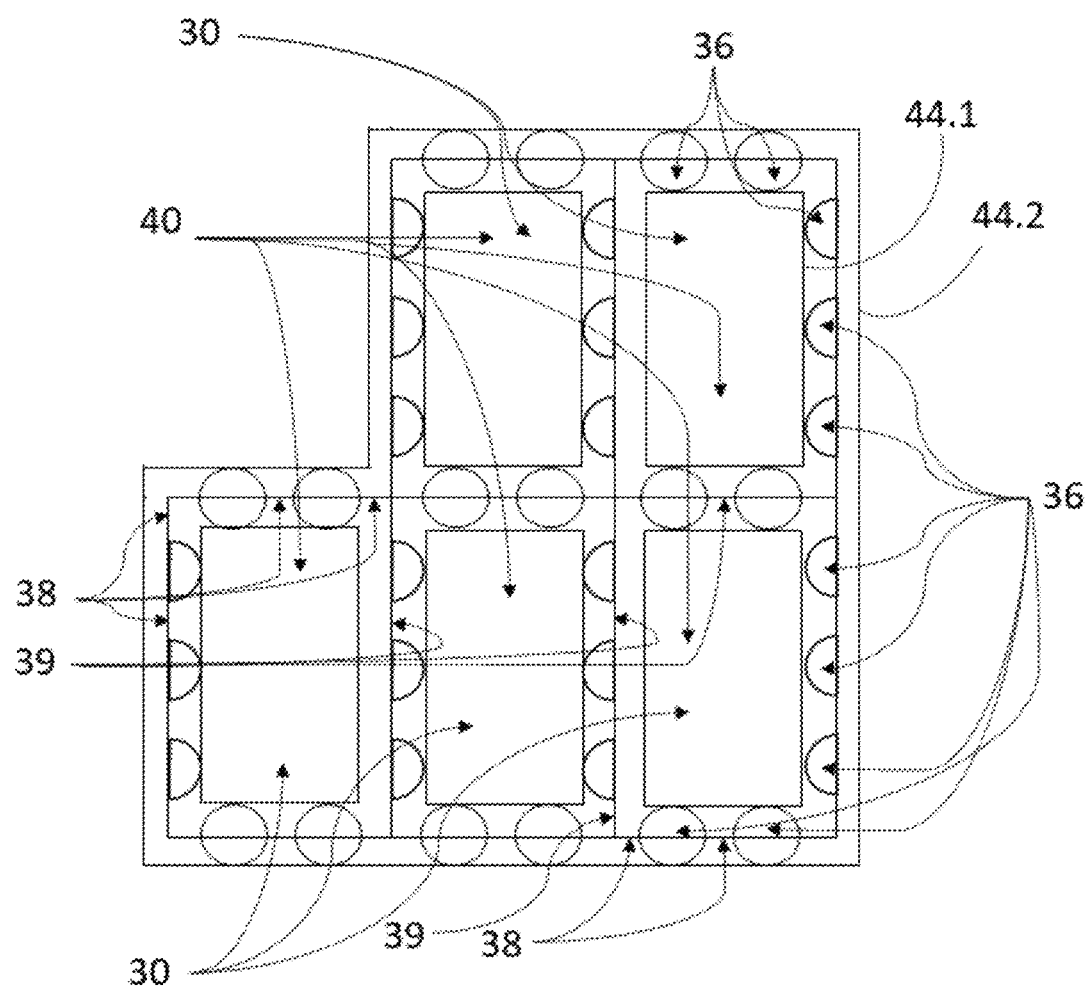
FIG. 16 is a top view of a device for absorbing energy by compression comprising five modules for absorbing energy by compression, illustrating an embodiment of the disclosure herein.
Figure 17:
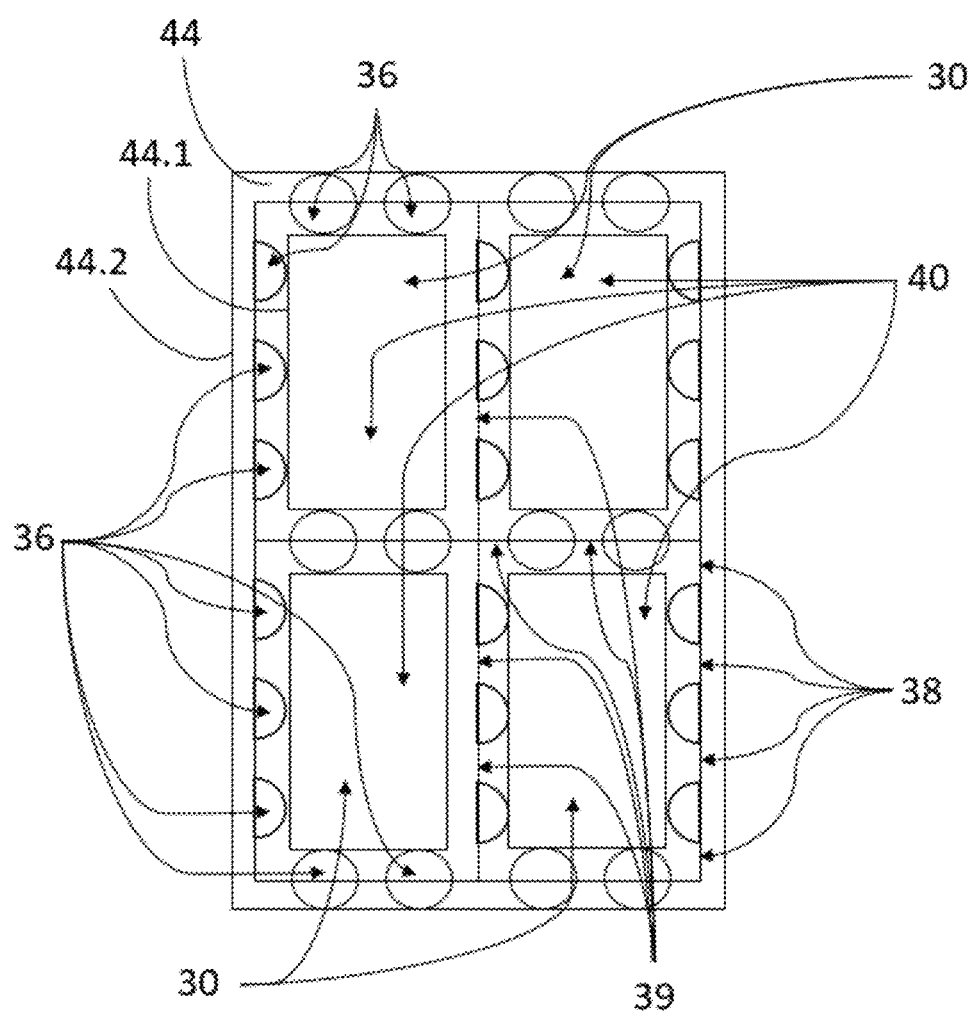
FIG. 17 is a top view of a device for absorbing energy by compression comprising four modules for absorbing energy by compression, illustrating an embodiment of the disclosure herein.
Figure 18:
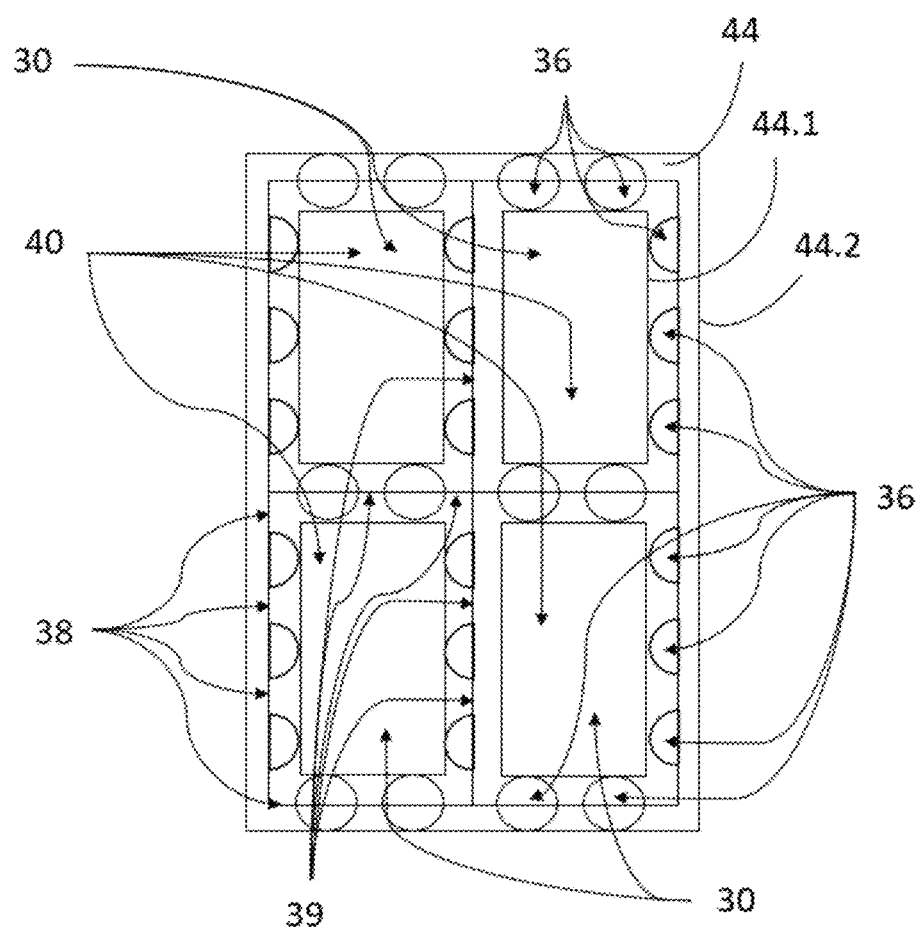
FIG. 18 is a top view of a device for absorbing energy by compression comprising four modules for absorbing energy by compression, illustrating an embodiment of the disclosure herein.

According to an embodiment visible in FIGS. 5, 12 and 13, the device for absorbing energy by compression comprises at least one attachment system 48 connecting each module 30 for absorbing energy by compression to at least one element from among the first and second elements 32, 34 between which the module 30 for absorbing energy by compression is positioned. According to one configuration, this attachment system 48 is configured to enable rapid assembly or removal of the module 30 for absorbing energy by compression.

According to an embodiment visible in FIGS. 15 to 18, the device for absorbing energy by compression comprises at least two modules 30 for absorbing energy by compression, of which at least one module for absorbing energy by compression comprises at least one joining wall 39 in common with another module 30 for absorbing energy by compression.

According to an embodiment, one of the joining walls 38 of the device for absorbing energy by compression comprises at least one system for fastening to at least one first end wall 44 and to at least one second end wall 46. More particularly, the common joining wall 39 comprises at least one system for fastening to at least one first end wall 44 and to at least one second end wall 46. Even more particularly, at least one of the joining walls 38 parallel to the common wall comprises fasteners in relation to at least one first end wall 44 and to at least one second end wall 46.

According to another embodiment, one of the joining walls 38 of the module for absorbing energy by compression comprises at least one system for fastening to at least one first end wall 44 and to at least one second end wall 46.

In the case of an aircraft, each module 30 for absorbing energy by compression comprises several attachment systems 48 for connecting it to the fuselage 12 (more particularly to the skin 20 of the fuselage 12) and/or to the belly fairing 28. According to one configuration, each module 30 for absorbing energy by compression is connected only to a single element from among the first and second elements 32, 34. According to one arrangement, the first element 32 being offset upwards with respect to the second element 34 (when the aircraft is on the ground), each module for absorbing energy by compression is suspended below the first element 32, specifically the fuselage 12 or the tank 26.

According to one arrangement, each module 30 for absorbing energy by compression is connected only to the fuselage 12 and/or to the tank and is not connected to the belly fairing 28. According to this arrangement, each module 30 for absorbing energy by compression is suspended below the fuselage 12. Insofar as each module 30 for absorbing energy by compression is connected only to a single element from among the fuselage 12 and the belly fairing 28, it does not transmit any loads between the fuselage 12 and the belly fairing 28, thus simplifying the design thereof.

According to an embodiment, each module 30 for absorbing energy by compression is independent of the first and second elements 32, 34 (fuselage 12 or belly fairing 28) between which it is positioned and connected to at least one of these first and second elements 32, 34 by the removable attachment system(s) 48. A removable connection is understood to mean that each module 30 for absorbing energy by compression can be assembled or removed several times, without affecting the characteristics of the first and second elements 32, 34. In this regard, each attachment system 48 is designed to be connected to the first or second element 32, 34 without any modification of the latter.

According to one arrangement visible in FIG. 13, each module 30 for absorbing energy by compression is spaced apart from the first and second elements 32, 34. According to an embodiment, each attachment system 48 comprises a mounting angle 50 that has a first flange 50.1 pressed against the first or the second element 32, 34 and connected to the latter by at least one first connection element 52, a second flange 50.2 pressed against the module 30 for absorbing energy by compression and connected to the latter by at least one second connection element 52', and a web 50.3 connecting the first and second flanges 50.1, 50.2 so as to form a single Z-shaped part. At least one of the first and second connection elements 52, 52' is removable and is in the form of a bolt, for example. Of course, the disclosure herein is not limited to this embodiment for the attachment systems 48. Thus, the attachment systems could have a C-shaped section.

While at least one example embodiment of the invention(s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for absorbing energy by compression configured to be positioned between first and second elements and to be subjected to compressive loads oriented in a compression direction, the device comprising at least one module for absorbing energy by compression which comprises several first conduits which are oriented in the compression direction and each have a cross section and first and second ends, wherein the first conduits are spaced apart from one another, and wherein the module for absorbing energy by compression comprises joining walls, parallel to the compression direction, which connect the first conduits to delimit, with the latter, at least one second conduit, and wherein the module for absorbing energy by compression comprises at least one first end wall configured to close the first end of at least one first conduit and at least one second end wall configured to close the second end of at least one first conduit.

2. The device for absorbing energy by compression according to claim 1, wherein the module for absorbing energy by compression comprises at least one first end wall which is configured to close the first end of at least one first conduit and leaves the second conduit at least partially open, and at least one second end wall which is configured to close the second end of at least one first conduit and leaves the second conduit at least partially open.

3. The device for absorbing energy by compression according to claim 1, wherein each of the conduits delimiting the conduit is spaced apart from all other conduits delimiting a same conduit.

4. The device for absorbing energy by compression according to claim 1, wherein each second conduit has a cross section greater than a cross section of each first conduit bordering the second conduit.

5. The device for absorbing energy by compression according to claim 1, wherein the joining walls are oriented in two or three directions to obtain a network of an orthogrid or isogrid type.

6. The device for absorbing energy by compression according to claim 1, wherein the module for absorbing energy by compression comprises at least one second conduit of substantially square or substantially rectangular cross section, first conduits being positioned on sides of the cross section of the substantially square or substantially rectangular second conduit or conduits and spaced apart from vertices of the cross section of each second conduit.

7. The device for absorbing energy by compression according to claim 1, wherein the module for absorbing energy by compression comprises, on sides of the second conduit, two or three cylindrical and/or semicylindrical first conduits.

8. The device for absorbing energy by compression according to claim 1, wherein the module for absorbing energy by compression comprises one or more first end walls closing the first end of all the first conduits and leaving the second conduit at least partially open, and one or more second end walls closing the second end of all the first conduits and leaving the second conduit at least partially open.

9. The device for absorbing energy by compression according to claim 1, wherein each of the first and second end walls forms a frame delimited by an inner edge and by an outer edge spaced apart from the inner edge by a distance sufficient to close the first conduits of the module for absorbing energy by compression.

10. The device for absorbing energy by compression according to claim 1, wherein each module for absorbing energy by compression comprises at least one attachment system for connecting it to at least one element from among the first and second elements between which the module for absorbing energy by compression is positioned.

11. The device for absorbing energy by compression according to claim 1, comprising at least two modules for absorbing energy by compression, and wherein at least one module for absorbing energy by compression comprises at least one joining wall in common with another module for absorbing energy by compression.

12. The device for absorbing energy by compression according to claim 1, wherein one of its joining walls comprises at least one system for fastening to at least one first end wall and to at least one second end wall.

13. The device for absorbing energy by compression according to claim 11, wherein the common joining wall comprises a system for fastening to at least one first end wall and to at least one second end wall.

14. The device for absorbing energy by compression according to claim 13, wherein at least one of the joining walls parallel to the common wall comprises at least one system for fastening to at least one first end wall and to at least one second end wall.

15. An aircraft comprising at least one device for absorbing energy by compression according to claim 1.

* * * * *